United States Patent Office 3,394,159
Patented July 23, 1968

3,394,159
CYCLIC ORGANOSILICON COMPOUNDS
Tse C. Wu, Waterford, N.Y., assignor to General Electric
Company, a corporation of New York
No Drawing. Filed Dec. 14, 1964, Ser. No. 418,290
4 Claims. (Cl. 260—448.2)

ABSTRACT OF THE DISCLOSURE

Cyclic organosilicon compounds containing both silicon-silicon and siloxane linkages are encompassed by the formula:

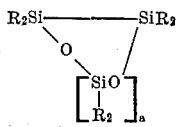

where R is a monovalent hydrocarbon radical free of aliphatic unsaturation, both of the R radicals on a majority or all of the silicon atoms are aryl radicals and $a$ is an integral number of from 2 to 3. The cyclic compounds are formed by the reaction of a dichlorodisilane having the formula

with an organopolysiloxane diol having the formula

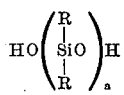

where R and $a$ are as defined above. The cyclic compounds of the present disclosure are useful as thickeners in silicone greases to be used in high temperature applications.

---

This invention relates to cyclic organosilicon compounds. More particularly, it realtes to organosilicon compounds having the formula:

(1)
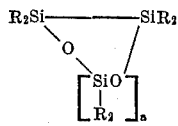

where R is a monovalent hydrocarbon radical free of aliphatic unsaturation, and $a$ is an integral number of from 2 to 3, inclusive. Thus, the compounds of the present invention are cyclic organosilicon compounds containing both silicon-silicon linkages and siloxane linkages. Such compounds, by contrast with organocyclopolysiloxanes, are extremely heat stable to alkali at high temperatures.

These compounds are unique in that they are cyclic organosilicon compounds containing an odd number of atoms in the ring, particularly one pair of silicon atoms bonded through a silicon-silicon linkage, the remainder of the silicon atoms being bonded by the more standard siloxane linkages. The compounds resist alkaline treatment at high temperature which makes them valuable as additives in high temperature organopolysiloxane greases and resins.

The cyclic compounds of the present invention are formed by the reaction of a dichlorodisilane having the formula:

(2)

with an organopolysiloxanediol having the formula:

(3)
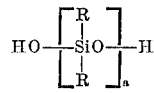

where R and $a$ are as defined above, in the presence of an acid acceptor. The reaction of the chlorides of the compound of Formula 2 with the hydrogens of the hydroxyl groups of the compound of Formula 3 results in a condensation and the elimination of hydrogen chloride.

Each R is a monovalent hydrocarbon radical free of aliphatic unsaturation, and can be the same or different. Among the hydrocarbon radicals which can be present in the compounds of the present invention are alkyl radicals, such as e.g., methyl, ethyl, propyl, octyl, octadecyl, etc., cycloalkyl radicals, such as e.g., cyclohexyl, cycloheptyl, cyclopentyl, etc.; and substituted alkyl radicals, such as, e.g., chloropropyl, chloromethyl, $\gamma,\gamma,\gamma$-trifluoropropyl, cyanoethyl, etc. Among the aryl radicals which R can represent are phenyl, biphenyly, naphthyl, paraphenoxyphenyl, tolyl, xylyl, etc.; aralkyl radicals, such as benzyl, phenylethyl, etc.; and substituted aryl radicals, such as trifluoromethylphenyl, chlorophenyl, bromotolyl, etc.

As mentioned, acid acceptors are used in the reaction of the compound of Formula 2 with the compound of Formula 3. The hydrogen chloride eliminated by the condensation of the chloride and the hydrogen of the hydroxy group must be removed to permit completion of the desired reaction. Particularly advantageous acid acceptors are the amines, and one mole of an amine will absorb approximately one mole of hydrogen halide. Therefore, there should be at least one mole amine present for each mole of hydrogen chloride to be generated. Among the amines which can be used as acid acceptors, without otherwise adversely affecting the reaction, are tertiary amines, such as pyridine, picoline, quinoline, 1,4-diazabicyclo(2,2,2)-octane, and dialkyl anilines. No catalyst is necessary for the reaction.

The reaction is coducted in a solvent, preferably in low concentrations, as low concentrations promote the formation of cyclic compounds as opposed to longer chain organosilicon compounds. The solvent can be any organic solvent inert to the reactants under the conditions of reaction. Especially preferred solvents are the hydrocarbons, such as benzene, hexane, etc. The concentration of the reactants of Formula 2 and Formula 3 should be kept in the range of from 5 to 25 percent of the total reaction mixture. The order of addition of the various reactants to the solvent solution is not critical, except that the amine acid acceptor must be present prior to the combination of the reactants of Formula 2 and Formula 3. While it is preferred that the reactants be present in the stoichiometric ratio of 1:1, a 5 percent excess of either may be present without adversely affecting the final product obtained.

The reaction can be conducted at any temperature from room temperature to the boiling point of the lowest boiling member of the reaction mixture. However, as the reaction is essentially complete in one hour, even at room temperature, there is no particular advantage in using higher temperatures. Following addition of the reactants and a stirring period of at least about one hour at room temperature to allow completion of the reaction, the reaction mixture is filtered to separate some of the unreacted raw materials and the amine hydrochloride, formed from the amine acid acceptor and the generated hydrogen chloride. The reaction solvent is then evaporated and the product is purified by recrystallization from a solvent such as cyclohexane, hexane, heptane, and similar materials.

The result is a fine crystal representing the product of Formula 1.

The following examples are illustrative of the formation of the product of the present invention, but should not be considered as limiting in any way the full scope of the invention as covered in the appended claims.

EXAMPLE 1

In this example, octaphenyl - 2,3,5,7-tetrasila-1,4,6-trioxacycloheptane having the formula:

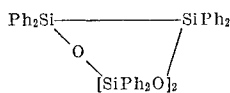

where Ph is phenyl, was formed. A solution of 5 ml. of pyridine in 100 ml. of benzene was placed in a 500 ml. reaction flask. Simultaneously, a first solution containing 8.7 g. (0.02 mole) of sym-dichlorotetraphenyldisilane in 50 ml. of benzene and a second solution containing 8.3 g. (0.02 mole) of sym-tetraphenyldisiloxanediol were added to the benzene-pyridine solution over a period of 30 minutes at room temperature, while maintaining stirring. The resulting slurry was stirred for 3 hours and was then allowed to stand overnight. After standing, the reaction mixture was filtered to separate 2.7 g. of solids containing chiefly pyridine hydrochloride. The solvent was evaporated from the filtrate, yielding 12 g. (77% based on the theoretical) of solids melting at 175°–190° C. The solids were recrystallized twice from cyclohexane and produced fine crystals melting at 218°–220° C. An infrared spectrum showed prominent absorption bands at 7.0, 10.0, and 14.3 microns, indicative of silicon-phenyl bonds, and a prominent absorption band at 9.3 microns, consistent with the 7-membered ring compound described in this example.

The purified material was melted and to it was added a catalytic amount of potassium hydroxide dissolved in octamethylcyclotetrasiloxane. The mixture was heated for 1.5 hours at 232° C. and was then tested. It was found that there had been no reaction, the original cyclic compound being retained intact.

EXAMPLE 2

In this example, 2,2,3,3-tetraphenyl-5,5,7,7-tetra-p-tolyl-2,3,5,7-tetrasila - 1,4,6 - trioxacycloheptane having the formula:

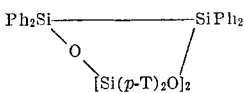

where Ph represents phenyl and p-T represents the paratolyl radical, was produced. A solution containing 5 ml. of pyridine in 200 ml. of benzene was placed in a reaction flask. Simultaneously, a first solution containing 8.7 g. (0.02 mole) of sym-dichlorotetraphenyldisilane in 100 ml. of benzene and a second solution containing 9.4 g. (0.02 mole) of sym-tetra-p-tolyl-disiloxanediol in 100 ml. of benzene were added to the pyridine-benzene solution. The addition was carried out over a period of about 60 minutes at room temperature, while stirring. The resulting slurry was allowed to stand overnight and was then filtered to remove the solids. The solvent was stripped from the filtrate to give 11.7 g. of resulting solids (70% based on the theoretical), melting at 145°–165° C. These solids were recrystallized twice from cyclohexane, yielding fine crystals with a melting point of 163.5°–165° C. An infrared spectrum of the purified product showed bands at 7.0, 10.0, and 14.3 microns, indicative of silicon-phenyl bonds, a prominent band at 12.4 microns, indicative of silicon-para-tolyl bonds, and the band at 9.3 microns, consistent with the 7-membered ring described in the present example.

This purified compound was melted, held at 170° C., and to it was added a catalytic amount of potassium hydroxide dissolved in octamethylcyclotetrasiloxane. The temperature was maintained, with stirring, for one hour and the material was then tested. It was found that there had been no reaction and that the original 7-membered cyclic organosilicon compound was intact.

EXAMPLE 3

In this example, 2,2,3,3 - tetramethyl-5,5,7,7,9,9-hexaphenyl-2,3,5,7,9-pentasila - 1,4,6,8-tetraoxanonane having the formula:

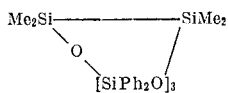

where Me is methyl and Ph is phenyl, is produced. A solution is prepared in a reaction flask containing 15 ml. of 1,4-diazabicyclo(2,2,2)octane in 150 ml. of toluene. Two solutions are added to the amine-toluene solution. The first solution contains 5.6 g. (0.03 mole) of sym-dichlorotetramethyldisilane in 100 ml. of toluene and the second solution contains 19 g. (0.031 mole) of sym-hexaphenyltrisiloxanediol in 200 ml. of toluene. The reaction mixture is stirred for about 1.5 hours following the addition and is then filtered to remove the unreacted hexaphenyltrisiloxanediol and the amine hydrochloride. The solvent is stripped from the filtrate and the resulting solids recrystallized twice from heptane, resulting in pure crystals having the stated 9-membered ring formula.

As noted, the compounds of the present invention are extremely heat stable, showing no reaction even after heating at high temperatures in the presence of caustic. Hence, they may be used as heat-stable additives for various compounds, including greases and resins to be used at high temperatures. Because of the similarity in structure of the compounds of the present invention with organopolysiloxane fluids, for example, when these novel compounds are combined with such fluids they are more compatible than silica is, for example, and thus, less easily separated. For example, an extremely homogeneous grease, stable at high temperatures, can be formed by milling 10% by weight, of the compound of Example 1 with a methylphenylpolysiloxane fluid.

While specific examples of the compounds of this invention have been shown and described, it is not intended to be limited to these particular formulations. The full scope of the invention is covered in the appended claims.

What I claim as new and desire to secure by Letters Patent of the United States is:

1. A cyclic organosilicon compound having the formula:

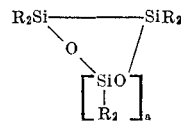

where R is an aryl radical and $a$ is an integral number of from 2 to 3, inclusive.

2. The compound:

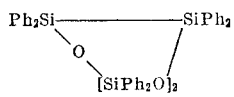

where Ph is the phenyl radical.

3. The compound:

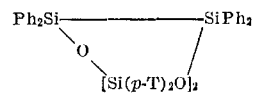

where Ph is the phenyl radical and p-T is the para-tolyl radical.
4. The compound:
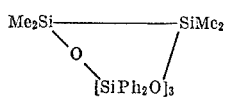
where Me is the methyl radical and Ph is the phenyl radical.
References Cited
UNITED STATES PATENTS
2,766,220 10/1956 Kantor _____ 260—448.2 XR
2,923,633 2/1960 Stedman _____ 260—448.2 XR
3,178,392 4/1965 Kriner _____ 260—448.2 XR
TOBIAS E. LEVOW, *Primary Examiner.*
P. F. SHAVER, *Assistant Examiner.*